United States Patent [19]

Schad

[11] Patent Number: 5,366,550
[45] Date of Patent: Nov. 22, 1994

[54] LATEX MODIFIED CEMENT-BASED THIN SET ADHESIVE

[75] Inventor: Gregory W. Schad, Algonquin, Ill.

[73] Assignee: TEC Incorporated, Palatine, Ill.

[21] Appl. No.: 42,478

[22] Filed: Apr. 2, 1993

[51] Int. Cl.$^5$ .............................................. C04B 24/10
[52] U.S. Cl. .................... 106/730; 106/691;
  106/694; 106/696; 106/724; 106/729; 106/737;
  106/738; 106/802; 106/811; 106/804; 106/817;
  106/823; 106/902; 524/650
[58] Field of Search ............... 106/696, 724, 729, 730,
  106/737, 819, 823, 691, 694, 738, 802, 804, 811,
  817, 902; 524/650

[56] References Cited

U.S. PATENT DOCUMENTS

| | | | |
|---|---|---|---|
| 3,663,287 | 5/1972 | Mizunuma et al. | 106/315 |
| 3,936,311 | 2/1976 | Kirst et al. | 106/90 |
| 4,010,936 | 3/1977 | Takashima | 266/45 |
| 4,066,463 | 1/1978 | Chollet | 106/15 |
| 4,073,658 | 2/1978 | Ohtani et al. | 106/92 |
| 4,088,504 | 5/1978 | Collepardi | 106/90 |
| 4,741,777 | 5/1988 | Williams et al. | 106/729 |
| 4,746,365 | 5/1988 | Babcock et al. | 106/729 |

FOREIGN PATENT DOCUMENTS

| | | |
|---|---|---|
| 821726 | 2/1975 | Belgium . |
| 823869 | 4/1975 | Belgium . |
| 50-115243 | 9/1975 | Japan . |
| 54-157128 | 12/1979 | Japan . |
| 1425822 | 1/1972 | United Kingdom . |
| 1508761 | 2/1977 | United Kingdom . |
| 2048235 | 4/1980 | United Kingdom . |

*Primary Examiner*—Karl Group
*Assistant Examiner*—Michael Marcheschi
*Attorney, Agent, or Firm*—Merchant, Gould, Smith, Edell, Welter & Schmidt

[57] ABSTRACT

A novel cement-based composition comprising a cement powder, a polymeric latex composition, and a water-soluble polysaccharide compound is disclosed. This composition is useful in adhering ceramic and vitreous tiles to plywood substrates. The composition can also be formulated to be an underlayment for preparing a substrate for flooring including carpet, tiles, wood flooring, etc.

12 Claims, No Drawings

LATEX MODIFIED CEMENT-BASED THIN SET ADHESIVE

FIELD OF THE INVENTION

The present invention relates to a cement-based adhesive composition for use in forming relatively thin adhesive layers in composite constructions. More particularly, the invention relates to a composition comprising a cement component, a polymeric latex composition, and a water soluble polysaccharide compound.

BACKGROUND OF THE INVENTION

Thin layers of cement-based adhesives used to adhere materials such as ceramic tiles to a substrate have been used for a long period of time. These adhesives are sometimes called thin set adhesives. Cement-based adhesives work well when both the substrate and adherent are inorganic materials such as masonry structures, stone, brick, tile, concrete surfaces, etc. However, when either the adherend, substrate, or both are cellulosic materials such as wood, these cement-based adhesive form bonds which are substantially less effective. There have been numerous attempts to improve thin set adhesive to cellulosic substrate bonds. One major improvement has been latex modified cement (thin set) mortars in which a polymeric latex material is added to the cement powder. These mortars are used for the installation of ceramic tiles to a variety of substrates including wallboard, plywood, concrete, etc.

Cement hydrates to form a strong solid mass. This hydration continues for a long period (upwards of 2 years). During this process latex modified mortars tend to lose some of their adhesion and flexibility. As the cement continues to harden, these latex modified thin-sets tend to lose some of its peak adhesion and flexibility. Peak adhesion and flexibility peak adhesion and flexibility usually occur around 14 to 28 days.

Additionally, the building industry has moved toward the use of solid body vitreous, porcelain or glass tile. These impervious tiles are significantly harder to bond because of their low absorption rates and smooth vitreous surfaces. While latex modified thinset mortars do adhere to those non-porous tiles, the resulting bond is of low quality and can fail under shear stresses.

However, even these modified thin set adhesives suffer from the poor quality of the adhesive bond between the cement-based adhesive mass and the cellulosic and non-porous substrates. A particular problem with this type of installation has been job failures over plywood and vitreous tile failures. Ceramic tile tends to fail adhesively to (in particular) plywood substrates because of a number of problems, but most often related to substrate movement or simply poor adhesion to the plywood.

Therefore, a modified cement-based adhesive is needed which can effectively bond to cellulosic and non-porous materials such as wood, wallboard and vitreous or glass tiles.

SUMMARY OF THE INVENTION

It has been discovered that an adhesive composition which is prepared from about 5 to 95 parts by weight of a cement powder, about 0.25 to 75 parts by weight (based on the polymeric solids content) of a polymeric latex, about 0.01 to 10 parts by weight of a water soluble polysaccharide component, about 0 to 90 parts by weight of a filler, and a sufficient amount of a water to form a paste is useful in forming effective bonds with cellulosic substrates and non-porous, vitreous-type materials. In addition, a method of forming strong, durable bonds between a thin set cement-based adhesive and a cellulosic substrate has been devised using this thin set adhesive composition.

The term "polymeric latex composition" as used herein in the specification and in the claims is intended to include both liquid polymeric latexes and dried polymeric latex solids.

DETAILED DESCRIPTION OF THE INVENTION

The present invention relates to the use of a new and improved adhesive mass for binding adherends to cellulosic substrates, such as plywood, and non-porous adherends such as vitreous tile. The adhesive composition comprises a cement powder, a polymeric latex composition, a water soluble polysaccharide compound and, optionally, a filler, pozzolithic additives, cellulosic additives, thickeners, pigments, accelerators, damp proofing/water proofing additives, plasticizers, defoamers, preservatives, and water reducers. This composition, when combined with a sufficient amount of water to form a paste, provides a highly effective cement based thin set adhesive composition.

Cement Compound

Cement powders useful in the present invention include Portland cement, calcium aluminate, blast furnace slag, Portland/Pozzolan cement, Pozzolan cement, etc. Portland cement, typically conforming to ASTM C-150-55, is the result obtained by pulverizing a clinker consisting essentially of hydraulic calcium silicates with additions of calcium sulfates. Other additions (not to exceed 1%) may be interground with a clinker to alter cement properties. Portland/blast furnished slag cement, typically conforming to ASTM C205-53T, is a mixture consisting of silicates and aluminum silicates of calcium developed as a byproduct of iron production, and it is produced by rapidly chilling/quenching molten material in water, steam or air. Portland-Pozzolan cement, typically conforming to ASTM C-340-55T, is an interground mixture of Portland cement clinker and Pozzolan or a uniform blend of Portland/Pozzolan cement and fine Pozzolan. Pozzolan should constitute no more than 50 wt-%, and no less than 15 wt-% of the Portland Pozzolan cement. Calcium aluminate cement is a hydraulic cement with higher percentages of aluminate than Portland cement. The principal hydraulic component is calcium aluminate produced from clinker based on high aluminate containing material.

Polymeric Latex Composition

The polymeric latex composition contributes adhesive and elastomeric properties to the cement-based system. The use of latex polymers in cement systems across a wide variety of concentration levels allows for the production of thin set adhesive mortars having a wide range of properties. Low levels of latex in cement systems can improve bonding, increase open time, etc. Very high levels, result in products that exhibit elastomeric qualities. A representative, non-limiting list of useful polymeric latex compositions include acrylics, vinyl acetate-ethylene (VAE) copolymers, styrene butidiene rubbers (SBR), etc. These latexes can be added to the adhesive composition in a liquid latex form, or they can be added as dried polymeric latex solids. Preferred latex compositions include VAE copolymers and acrylics. The most preferred latex is a VAE copolymer.

The adhesive formulator can select either a liquid polymeric latex or dried polymer latex solids. If a liquid polymeric latex is used, it will generally be combined with the desired amount of water and combined with the dry ingredients of the composition to form the mixed mortar before its application to a substrate. Examples of commercially available liquid latexes include acrylics such as PD 725 (H. B. Fuller Company), MC 76 (Rhom & Haas), and the SYNTHEMUL 40401 series (Reichold) and SBR's such as DOW 460 (Dow Chemical). Dried polymer latex solids are well known in the cement-based adhesive filed. These are generally the result of spray drying the liquid latex composition. Examples of commercially available dried latex polymers include sprayed dried VAE polymers such as the AIRFLEX RP series (Air Products and Chemicals, Inc.). DUR-O-ST CP3300 (National Starch), ELVACE 40785-00 (Reichold) acrylics such as E-2903 (Rhom & Haas), ACRONAL DS 6029 (BASF), vinyl acetate/ethylene/vinyl chloride terpolymers such as DURO-O-SET CP3303 (National Starch) and vinyl acetate/vinyl versitate copolymers such as ELOTEX 50V/908 (Union Carbide).

Water-Soluble Polysaccharide Compound

The water soluble polysaccharide compound can reduce the water resistance of cement based concretes and mortars. Additionally, the compound can retard a set time of cement mortars/concrete. However, the addition of this component significantly increases the adhesive strength of latex-modified cement-based adhesives. The use of very high levels of polysaccharide compounds can continue to marginally increase the adhesive strength of the resulting composition, but the negative effects of reduced water resistance and reduced set time quickly outweigh the benefit of the increased strength. Use of polysaccharide compound levels of greater than about 2 wt-% requires substantial modifications to the adhesive formula, such as incorporating accelerators, etc., to compensate for the cure retarding and water sensitivity problems. Very low levels of polysaccharide compound in the adhesive mass are ineffective to provide substantial increases in thin set adhesive strength with cellulosic substrates. Additions of polysaccharide compounds to cement systems without polymer do show increased adhesion, but the most significant gain occurs when the cement-based adhesive combines polymeric latex compositions and polysaccharide compounds.

The polysaccharide compound used in the present invention maybe a modified starch, dextrin, waxy starch, or waxy dextrin. Starch is essentially a polymer of glucose. Two major polymeric components are present: Amylose a linear $(1\rightarrow 4)$-$\alpha$-D-Glycan and Amylopectin, a branched D-Glycan with mostly $\alpha$-D-$(1\rightarrow 4)$ and approximately 4% $\alpha$-D-$(1\rightarrow 6)$ linkages. A typical starch from corn contains a mixture of approximately 25% Amylose and 75% Amylopectin and is essentially insoluble in both cold water or alcohol.

Water soluble polysaccharide polymers can be produced from any particular starch (corn, potato, tapioca) by acetylation, chlorination, acid hydrolysis or enzymatic action. Starch acetates, esters and ethers can be formed by these reactions in the form of stable and fluid solutions and films. Oxidized starches made with sodium hypochlorite have low gelling tendencies. Introduction of carboxyl, sulfonate or sulfate groups into starch give sodium or ammonium salts or anionic starches yielding clear, non-gelling dispersions of high viscosity.

Other modified starches (starch derivatives) can be produced by treating aqueous suspensions of starch granules with cross-linking reactants with resulting properties including increased stability to acids, heat or shear.

The hydrolysis of the long chained starch molecules into shorter chained, highly branched molecules improves water solubility. This aids in cold water dispersibility. As this solubility increases, it imparts water sensitivity to the material to which it is added.

Dextrins are starch based products prepared by partially hydrolyzing starches by heating or dry roasting the starch in the presence of an acid catalyst. The conversion process changes the properties to provide an increased cold water solubility and a color change. Dextrins tend to have lower molecular weights than starches and many modified starches and have increased water solubility and increased viscosity stability over unmodified starch.

Preferred water-soluble, polysaccharide compounds have several properties which effect the thin set cement-based adhesive. First, they generally exhibit excellent cold water dispersibility which provides immediate solubility in the cement composition and aids in its hydration. Second, these compositions have good pH and ionic salt stability which are appropriate for alkaline, high pH cement environments. They generally exhibit high film clarity which is very desirable for pigmented systems. The preferred aqueous polysaccharide compositions generally exhibit Newtonian flow characteristics, providing stable viscosity at varying shear rates. They offer surface active properties to aid in wetting a cellulose substrate for improved adhesion. They are compatible with polyvinyl alcohol which is often used to stabilize latex polymers used in the cement systems, and finally, they impart good tack to adhesive systems to help in the adhesion and wetting of a cellulosic substrate.

The variety of polysaccharide compounds available is extremely large. Various modifications, processing techniques, degree of derivation and extrication determine the affect of the starch polymer on the cement system. For instance, note that the pH of solution made with STARPOL 630 (Staley) is approximately 6 (25% solution) while the pH of ICB 3000 is approximately 4.5 (25% solution). One familiar with cement chemistry knows that high pH (basic) materials tend to accelerate set times while low pH (acidic) materials tend to retard set times. Indeed, comparing set times at equal levels of modification in identical formulas, the STARPOL 630 formula can set approximately 25% faster depending on formula. Conversely, in regard to water resistance, STARPOL 630 is more highly derived than ICB 3000. This derivation creates a more branched molecules that exhibit greater water solubility, and thus, it imparts greater water sensitivity in cement mortars.

As discussed above, the water soluble polysaccharide compound use in the present invention can be modified starch, dextrin waxy starch, or waxy dextrin. Preferably, the compound is a modified starch or dextrin. Preferred modified starches include acid hydrolyzed starches such as hydroxy ethyl ether substituted starch, hydroxy propyl ether substituted starch, and the like. Preferred dextrins include white dextrins and waxy dextrins.

Optional Components

The fillers useful in the thin set adhesive composition may be aggregates, extenders, silica sands, pebbles, calcium carbonates (limestone), diatomaceous earth, perlite, vermiculite, etc. These materials include those fillers which are clean and inert. Depending upon the end use of the product, these fillers/aggregates can range from as fine as 325 mesh (U.S.A. standard testing mesh seive) to as large as stone pebbles and crushed rock.

The Pozzolthic additives include fly ash, volcanic ash, fumed silica, precipitated silica, etc. These additives are substances which supply reactive silica to support calcium silicate hydration. In essence, the addition of these materials can densify, waterproof and harden and accelerate the set time hydraulic cement.

The cellulosics generally include all types of water soluble cellulose including ethyl hydroxyethyl cellulose, methylcellulose, hydroxy propylmethylcellulose, etc. These water retaining/swellable additives aid in cement hydration, open time, pot life, freeze-thaw stability, thixotropic properties, viscosity, adhesion, etc.

Thickeners can include the above cellulosics as well as alginates, polyvinyl alcohol polymers, protein, etc. Addition of these substances serves to control thixotropic, viscosity, bleeding, segregation, etc.

Pigments including iron oxide and titanium oxide can add coloration, if desired, to the thin set adhesive.

Cement accelerators include calcium formate, calcium chloride, lithium carbonate, etc. These components accelerate the set time of the cement-based adhesive.

Damp-proofing and water-proofing components include stearates, ethylene glycols, silanes, chlorinated paraffins, etc. These components aid in the water repellency of the adhesive mass, reduce water vapor transmission levels through the adhesive mass, etc.

Plasticizers such as phthalates, asphalt emulsions, etc. serve to soften and add flexibility to the relatively rigid cement based adhesive system.

Defoaming agents include silicone based materials such as SAG 10 from Union Carbide and oil based agents such as TYROSAN D-126, etc. These additives reduce air content for potential air entrainment during mixing and placement of the thin set adhesive.

Preservatives such as TROY 174, COSAN 101, etc. are useful fungicides of bactericides to prevent microbial attack of the adhesive mass.

Water reducers including melamine, formaldehyde, sodium phosphate, casein, oxidized sulfite liquors, sodium salts of alkyl naphthalene, sulfonic acid, etc. These compounds are generally disbursing agents which reduce water demand of cement mixes. These agents allow for the improved flow and handling characteristics of low water content cement based paste and slurries.

The proportions of the various components which may be included in the present cement based thin set adhesive are illustrated in the Table below. This Table is merely offered to guide the practitioner in formulating cement based thin set adhesive compositions according to the present invention. Indeed, the practitioner may decide that it is advantageous to operate in a "useful" range for 1 component, while operating in a "more preferred" range for another. The Table identifies the proportions of components as parts by weight needed to make up 100 parts of the total composition (exclusive of water).

TABLE

| Component | Useful | Preferred | More Preferred |
|---|---|---|---|
| Cement | 5–99 | 15–50 | 30–40 |
| Polymeric Latex Composition (based upon the polymeric solids content) | 0.25–75 | 0.5–50 | 1–10 |
| Polysaccharide Compound | 0.01–10 | 0.1–2 | 0.25–1 |
| Filler | 0–90 | 1–75 | 40–60 |
| Pozzathlic Additives | 0–90 | 0.5–20 | |
| Cellulosics | 0.01–5 | 0.02–2 | |
| Thickeners | 0.01–5 | 0.02–2 | |
| Pigments | 0.01–10 | 0.01–3 | |
| Accelerators | 0–3 | 0.01–2 | |
| Damp Proofing/Waterproofing | 0–3 | 0.01–2 | |
| Plasticizers | 0–10 | 0.01–2 | |
| Defoamers | 0–2 | 0.01–0.5 | |
| Preservatives | 0–1 | 0.01–0.2 | |
| Water Reducers | 0–2 | 0.01–0.5 | |

The balancing of the various components of the composition to form a thin set adhesive having desired properties is well understood in the art. The formulator can compensate negatives such as slow setting concrete and increased water sensitivity by raising cement and/or accelerator levels.

In the formation of the adhesive composition, the dry components of the adhesive, generally all but the water and/or aqueous latex polymeric latex composition, are dry blended to achieve a substantially uniform mixture. A quantity of the dry blend sufficient for the job at hand is then combined with sufficient water to form a paste. Of course, in some situations, additional water maybe added to form more of a slurry, but generally, in use as a thin set adhesive, a paste-like consistency is desired. After the addition of the water the mixture is agitated to thoroughly wet all of the dry materials to form a uniform paste consistency. The composition can then be applied in a thin coating, of less than about a ¼ inch on a cellulosic substrate, and a suitable adherend is then applied to the adhesive layer. The substrate-adhesive-adherend construction can then be compressed to intimately contact the adhesive with both the substrate and adherend, and the thin set adhesive is allowed to cure. In a slight modification, the polymer latex and starch, or the polymer latex alone, can be introduced into the mixture with the water as an aqueous dispersion of these components.

The cement-based composition can also be formulated as an underlayment composition. In a trowel-applied formulation, the composition is paste-like, or a slightly thinner slurry. The composition can be applied over a wide variety of substrates including wood, concrete, etc. Usually, the dry composition is mixed with liquid components to a relatively thick consistency for trowelling or to a somewhat thinner consistency for screeding. The underlayment composition can be applied up to about one inch thick or slightly more on the substrate. The underlayment composition sets up quickly and bonds securely to the substrate.

In a self-leveling underlayment application, the composition is formed into a substantially thinner slurry (similar to a heavy syrup). The underlayment formulation is designed for reduced shrinkage, and it can be modified to be used with or without a primer. Preferably, with the use of a composition according to the present invention, a primer is not needed to prepare a useful underlayment. Again, the dry ingredients are mixed with the liquid component (which may include the latex and/or polysaccharide components). In application, the self-leveling underlayment is poured onto a substrate which may be diked to a desired level to provide a given underlayment thickness. The underlayment composition flows to self-level and to provide a continuous surface. Usually, the underlayment slurry is applied at about one-half inch per coating, and it is possible to apply multiple layers of the underlayment for more built-up surfaces.

While the use of the adhesive is generally described with regard to any adherend and a cellulosic substrate, this thin set adhesive can also be used to bond wood to wood, replacing high cost or environmentally dangerous solvent based adhesives, as a grout, to repair mortars, and as a trowelable or self-leveling underlayment.

The invention is further described below by resort to several examples describing various aspects of the present invention.

EXAMPLES

The following is specific examples, which contain the best mode, can be used to further illustrate the invention. These examples are merely illustrative of the invention and do not limit its scope.

EXAMPLE 1

The following components were combined in a dry blend as a control (A) and an example of the present invention (B).

| MATERIAL | (A) wt-% | (B) wt-% |
| --- | --- | --- |
| Portland Cement Grey | 35.00 | 35.00 |
| Silica Sand (70 Mesh) | 30.40 | 29.90 |
| Silica Sand (50 Mesh) | 30.00 | 30.00 |
| Calcium Formate | .45 | .45 |
| Vinyl Acetate/Ethylene (VAE) Dry Polymer (Airflex RP245) | 4.00 | 4.00 |
| Ethyl Hydroxyethyl Cellulose (300 ± 60 mPa · 5*) | .05 | .05 |
| Hydroxy Alkyl Methyl Cellulose (40,000 ± 4,000 mPa · 5*) | .10 | .10 |
| Polysaccharide Starch, Acid Hydrolyzed, 2 Hydroxypropyl Ether (Starpol 630) |  | .50 |

The resulting powders were mixed with water at a ratio of 170 g H$_2$O/1000 g mortar powder. Adhesive bond strength was tested using quarry tile to plywood shear and the results are illustrated below.

| | SHEAR BOND QUARRY TILE TO PLYWOOD | | |
| --- | --- | --- | --- |
| TIME PERIOD | SHEAR STRENGTH (PSI) 1A | STD. DEV. ( ) 2B | % INCREASE |
| 7 DAY | 179 (5.7) | 226.7 (4.9) | 26.6% |
| 28 DAY | 180 (5.9) | 219.6 (4.7) | 22.0% |

The data illustrate that an additional 0.5 wt-% of a polysaccharide compound (a) increases bond strength to plywood and (b) reduces the standard deviation in shear strength.

EXAMPLE 2

The following components were combined in a dry blend as a control (A) and examples of the present invention (B and C).

| MATERIAL | (A) wt-% | (B) wt-% | (C) wt-% |
| --- | --- | --- | --- |
| Portland Cement Grey | 35.00 | 35.00 | 35.00 |
| Silica Sand (70 Mesh) | 29.75 | 29.75 | 29.75 |
| Silica Sand (50 Mesh) | 30.00 | 29.75 | 29.5 |
| Calcium Formate | .45 | .45 | .45 |
| VAE Dry Polymer (Airflex RP245) | 4.50 | 4.50 | 4.50 |
| Ethyl Hydroxyethyl Cellulose (300 ± 60 mPa · 5*) | .20 | .20 | .20 |
| Hydroxy Alkyl Methyl Cellulose (40,000 ± 4,000 mPa · 5*0 | .10 | .10 | .10 |
| Polysaccharide Starch, Acid Hydrolyzed 2 Hydroxy Propyl Ether (Starpol 630) |  | .25 | .5 |

The resulting powders were again mixed at 170 g H$_2$O/1000 g dry powder. Adhesive bond strength was tested using quarry tile to plywood shear and vitreous tile to vitreous tile shear. The results are illustrated below.

| | SHEAR BOND (in psi) QUARRY TILE TO PLYWOOD | | | | |
| --- | --- | --- | --- | --- | --- |
| | | | | % INCREASE | |
| TIME PERIOD | [STD. DEV. IN ( )] | | | 2A–2B | 2A–2C |
| | #2A | #3A | #4A | | |
| 7 DAY | 195.2 (2.3) | 213.1 (3.82) | 230.1 (4.25) | 9.2 | 17.9 |
| 14 DAY | 178.9 (5.1) | 189.1 (3.62) | 209.5 (5.65) | 5.6 | 17.1 |
| 28 DAY | 164.7 (5.3) | 200.4 (5.7) | 225.0 (5.3) | 21.7 | 36.6 |

| SHEAR BOND STRENGTH VITREOUS TILE TO VITREOUS TILE 28 DAY IN PSI | | | | |
| --- | --- | --- | --- | --- |
| FORMULA | [STD. DEV. IN ( )9 | | % INCREASE | |
| 2A | 2B | 2C | 2A–2B | 2A–2C |
| 297.1 (4.7) | 325.4 (5.9) | 360.1 (7.2) | 9.5 | 21.2 |

From these examples we see more proof that simply adding starch polymer to the formula can increase bond strength dramatically. In the case of quarry to plywood, addition of 0.5% polymer starch increases the 28 day bond strength 36.6%.

Additionally, we now see that polymer starch can (at small levels of modification) dramatically increase bond strength to vitreous tile (21.2% increase 2A–2C).

Note the falling levels of bond strength in Formula 2A. Ideally, bond strength would rise continually and peak and remain flat (or increase) past 28 days. It is apparent from examination of shear assemblies, that starch polymer modified formulas "wet out"/penetrate the wood surface allowing for improved bonding potential. Hydrolysis of cement mortars over time tends to brittlize/harden latex mortars reducing flexibility and bonding strength. The use of these starch polymers reduces the loss of bond strength by allowing better adhesion with improved penetration of the wood surface.

EXAMPLE 3

| %      | MATERIAL A                                              |
|--------|---------------------------------------------------------|
| 37.00  | Portland Cement Grey                                    |
| 10.00  | Filler (Calcium Formate, and Fly Ash Type F             |
| .25    | Hydroxy Alkyl Methyl Cellulose (40,000 ± 4,000 mPa · 5*)|
| .15    | Ethyl Hydroxyethyl Cellulose (80,000 ± 5,000 mPa · 5*)  |
| .30    | Calcium Formate                                         |
| 52.30  | Silica Sand (70 Mesh)                                   |
| 100.00 |                                                         |

*Viscosity range, Brookfield 2% solution

| %      | MATERIAL B                                      |
|--------|-------------------------------------------------|
| 50.00  | Carboxylated Acrylic Polymer (Approximately 47% Solids) |
| 50.00  | Water                                           |
| 100.00 |                                                 |

| %      | MATERIAL C                                      |
|--------|-------------------------------------------------|
| 50.00  | Carboxylated Acrylic Polymer (Approximately 47% Solids) |
| 48.61  | Water                                           |
| 1.39   | Polysaccharide Starch Acid Hydrolyzed, 2 Hydroxy Propyl Ether |
| 100.00 |                                                 |

Powder A was mixed with liquid material B at a ratio of 270 grams liquid to 1000 grams dry powder. Adhesive bond strength was then measured using a quarry tile to plywood shear. Tests were then repeated mixing powder A with liquid C.

| | SHEAR BOND (IN PSI) QUARRY TILE TO PLYWOOD | | |
|---|---|---|---|
| TIME PERIOD | SHEAR STRENGTH [STD. DEV. IN ( )] | | % INCREASE (PSI) |
| | A + B ( ) | A + C ( ) | A + B − A + C |
| 7 DAY | 180.8 (7.7) | 239.7 (5.4) | 32.6% |
| 28 DAY | 216.5 (7.7) | 235.7 (5.8) | 8.9% |
| 56 DAY | 176.3 (5.9) | 239.2 (3.3) | 35.7% |

In these examples we see how the starch polymer that is added to a liquid acrylic can improve bond strengths of ceramic tile mortars. Liquid acrylic polymers are mixed at the job site with either factory preparing or field prepared mortars to improve adhesive strength and flexibility. In this example the starch polymer is added to the liquid which is then mixed at the installation. We see the same effect as blending the starch polymer with the dry powder as detailed in previous examples. In many instances, it is more advantageous to sell liquid additives.

The percentage increase in bond strength to plywood and the lower standard deviations of the shears is apparent in compositions having the modified starch component. Also, the bond strength at 56 day of A+B (no starch) falls, while A&C (starch) exhibits a very steady retention of bond strength.

EXAMPLE 4

The following components were combined in a dry blend as a control (A) and examples of the present invention (B).

| MATERIAL | (A) wt-% | (B) wt-% | (C) wt-% |
|---|---|---|---|
| Portland Cement Grey | 38.00 | 38.00 | 38.00 |
| VAE Dry Polymer (AIRFLEX RP245) | 5.00 | 4.00 | 0.0 |
| VAE Dry Polyer (AIRFLEX RP244) | 0.0 | 0.0 | 4.0 |
| Calcium Formate | 0.75 | 1.25 | 1.25 |
| Hydroxy Alkyl Methyl Cellulose (40,000 ± 4,000 mPa · 5*) | 0.35 | 0.35 | 0.35 |
| Filler (Calcium Carbonate 200 Mesh) | 2.50 | 2.50 | 2.5 |
| Hydroxy Propyl Methyl Cellulose (4,000 ± 500 mPa · 5*) | 0.05 | 0.05 | 0.05 |
| Polysaccharide Starch, Acid Hydrolyzed, Hydroxypropyl Ether (Starpol 630) | | 0.50 | 0.5 |
| Silica Sand (70 Mesh) | 53.25 | 53.35 | 53.35 |

Formulas 4A, 4B and 4C were mixed with water at a ratio of 210 g H₂O/1000 g dry powder. Shear bond tests were set up with quarry tile to plywood and vitreous tile to vitreous tile.

| | SHEAR BOND (IN PSI) QUARRY TILE TO PLYWOOD | | | | |
|---|---|---|---|---|---|
| TIME PERIOD | SHEAR STRENGTH [STD. DEV. IN ( )] | | | % INCREASE | |
| | #4A ( ) | #4B ( ) | #4C ( ) | 4A--4B | 4A--4C |
| 7 DAY | 185.5 (3.7) | 192.9 (3.7) | 183.7 (5.1) | 4.0 | −.9 |
| 14 DAY | 165.8 (4.8) | 202.7 (5.1) | 192.4 (6.9) | 22.0 | 16.0 |
| 28 DAY | 162.9 (4.2) | 191.4 (4.2) | 196.2 (5.6) | 17.5 | 20.4 |
| 56 DAY | 200.1 (4.2) | 221.5 (5.1) | 212.8 (3.3) | 10.7 | 6.3 |

| | SHEAR BOND STRENGTH (IN PSI) VITREOUS TILE TO VITREOUS TILE 28 DAY | | | | |
|---|---|---|---|---|---|
| TIME PERIOD | SHEAR STRENGTH [STD. DEV. IN ( )] | | | % INCREASE | |
| | #4A ( ) | #4B ( ) | #4C ( ) | 4A--4B | 4A--4C |
| 28 DAY | 396.9 (5.9) | 457.4 (7.6) | 493.7 (8.7) | 15.2 | 24.4 |

| | WET SHEAR BOND STRENGTH (IN PSI) VITREOUS TILE TO VITREOUS TILE | | | | |
|---|---|---|---|---|---|
| TIME PERIOD | SHEAR STRENGTH [STD. DEV. IN ( )] | | | % INCREASE | |
| | #4A ( ) | #4B ( ) | #4C ( ) | 4A--4B | 4A--4C |
| 7 DAY CURE/* 7 DAY WATER SOAK | 131.7 (4.5) | 147 (7.5) | 152.6 (4.5) | 11.9 | 15.9 |

| | WET SHEAR BOND STRENGTH (IN PSI) QUARRY TILE TO PLYWOOD | | | | |
|---|---|---|---|---|---|
| TIME PERIOD | SHEAR STRENGTH [STD. DEV. IN ( )] | | | % INCREASE | |
| | #4A ( ) | #4B ( ) | #4C ( ) | 4A--4B | 4A--4C |
| 7 DAY CURE/* DAY WATER SOAK | 43.4 (4.1) | 51.2 (5.5) | 62.4 (2.9) | 18.0 | 43.8 |

| TIME PERIOD | FREEZE THAW SHEAR BOND STRENGTH (IN PSI) | | | % INCREASE | |
|---|---|---|---|---|---|
| | SHEAR STRENGTH [STD. DEV. IN ( )] | | | 4A-- 4B | 4A-- 4C |
| | #4A ( ) | #4B ( ) | #4C ( ) | | |
| 28 DAY CURE/20 FREEZE-THAW CYCLES* | 149.4 (5.8) | 145.9 (4.5) | 192.9 (7.2) | −.3 | 29.1 |

The above formulas point out a major benefit of the use of the starch polymer to improve bonds to plywood an vitreous tile. Formulas 4B and 4C vary only from 4A in dry latex and Calcium Formate content and with the presence of starch polymer. As is apparent from the above shear strengths, the addition of 0.5% polymer starch allows for the reduction of latex content by 1%. Because of the water soluble and retarding effects of starch polymer, one familiar with the art of mortar formulation knows to raise the level of accelerator (Calcium Formate) to compensate for slow set time (caused by starch polymer). While returning set times to acceptable levels, higher acceleration level also improves the water resistance of the starch polymer modified mortars by accelerating the formation of water resistant calcium aluminate and calcium silicate hydrates during cement hydration.

Modifying with starch polymer can improve (a) bond strength to plywood, (b) bond strength to vitreous, and (c) water soak bond strength to vitreous tile and plywood. Additionally, by using a less water sensitive dry latex, water and freeze-thaw bond strengths can be further improved in conjunction with starch polymer (see 4C).

Formula 4A, 56 Day quarry tile to plywood shear, rises from the 28 day result. Those familiar in the art will recognize this to be an anomaly and that in general, as latex cement mortars continue to hydrate, there is longer term reduction in adhesion without starch modification.

EXAMPLE 5

The following components were combined in a dry blend as a control (A) and examples of the present invention (B-E).

| MATERIAL | (A) wt-% | (B) wt-% | (C) wt-% | (D) wt-% | (E) wt-% |
|---|---|---|---|---|---|
| Portland Cement Grey | 37.00 | 37.00 | 37.00 | 37.00 | 37.00 |
| VAE Dry Polymer (Airflex RP245) | 4.00 | 4.00 | 4.00 | 4.00 | 4.00 |
| Calcium Formate | 1.25 | 1.25 | 1.25 | 1.25 | 1.25 |
| Hydroxy Alkyl Methyl Cellulose (40,000 ± 4,000 mPa · 5*) | .30 | .30 | .30 | .30 | .30 |
| Ethyl Hydroxy Ethyl Cellulose (300 ± 60 mPa · 5*) | .10 | .10 | .10 | .10 | .10 |
| Silica Sand (70 Mesh) | 57.35 | 56.85 | 56.85 | 56.85 | 56.85 |
| Mirasperse | | .50 | | | |
| Starpol 530 W.S.P. (Water Soluble Polymer) | | | .50 | | |
| Stadex 79 Dextrin | | | | .50 | |
| I.C.B. 3000 | | | | | .50 |

The various powders were mixed with water at a ratio of 240 g H$_2$O/1000 g dry powder. Adhesive bond strength tested using a quarry tile to plywood shear.

| FORMULA | SHEAR BOND (IN PSI) QUARRY TILE TO PLYWOOD [STD. DEV. IN ( )] | | | | | |
|---|---|---|---|---|---|---|
| | 72 HOUR | 7 DAY | 14 DAY | 72 HR | 7 DAY | 14 DAY |
| 5A | 114.0 (4.4) | 213.0 (3.0) | 190.4 (6.9) | N.A. | N.A. | N.A. |
| 5B | 115.0 (3.3) | 189.0 (6.3) | 247.5 (4.9) | .8 | 16.2 | 30.0 |
| 5C | 201.2 (5.3) | 210.2 (5.0) | 231.4 (6.4) | 76.3 | −1.3 | 21.5 |
| 5D | 220.8 (4.8) | 232.0 (5.0) | 250.1 (5.2) | 93.7 | 8.9 | 31.4 |
| 5E | 230.2 (2.8) | 221.0 (7.7) | 248.5 (4.7) | 101.9 | 3.8 | 30.5 |

This series of tests were run to show the bond strength of a wider variety of modified starches and dextrins. Tests have shown that preferably the starch or dextrin polymer be low in viscosity, resistant to high pH (alkaline) conditions, water soluble and form as high a pH solution as possible. At 14 days, all starch or dextrin modified formulas (5B–5E) have at least 21.5% or better bond strength to plywood while exhibiting lower standard deviations.

EXAMPLE 6

The following components were combined in a dry blend as a control (A) and examples of the present invention (B and C).

| MATERIAL | (A) wt-% | (B) wt-% | (C) wt-% |
|---|---|---|---|
| Portland Cement Grey | 35.00 | 35.00 | 35.00 |
| VAE Dry Polymer (Airflex RP245) | 3.00 | 3.00 | 3.00 |
| Ethyl Hydroxy Ethyl Cellulose (40,00 ± 4,000 mPa · 5*) | .30 | .30 | .30 |
| Calcium Formate | .75 | .75 | .75 |
| Silica Sand (70 Mesh) | 60.95 | 60.45 | 60.45 |
| ICB 3000 | .50 | | |
| Polysaccharide starch, acid hydrolyzed 2-Hydroxy Propyl Ether (Starpol 63) | | .50 | |

Powders were mixed with water at a ratio of 200 g H$_2$O/1000 g dry powder. Adhesive strength tested using a plywood to plywood shear.

| SHEAR BOND STRENGTH QUARRY TILE TO PLYWOOD | | | | | |
|---|---|---|---|---|---|
| TIME PERIOD | SHEAR STRENGTH [STD. DEV. IN ()] | | | % INCREASE | |
| | #6A () | #6B () | #6C () | 6A–6B | 6A–6C |
| 72 Hour | 107.0 (7.8) | 104.0 (3.3) | 118.4 (4.5) | −2.8 | 10.9 |
| 5 Day | 101.9 (3.9) | 161.4 (5.4) | 155.4 (4.3) | 58.4 | 52.4 |

From these examples, the advantages of adding small amounts of starch polymers to improve adhesive strength of mortars are apparent. The potential for this product to be used as a wood-to-wood adhesive is also apparent.

EXAMPLE 7

The following components were combined in a dry blend as a control (A) and examples of the present invention used in an underlayment formulation (B and C).

| MATERIAL | (A) wt-% | (B) wt-% |
|---|---|---|
| Portland Cement Grey | 28.0 | 28.0 |
| Calcium Carbonate (200 Mesh) | 12.5 | 12.5 |
| Calcium Aluminate Cement 4000 BLAINE | 10.0 | 10.0 |
| Calcium Sulfate Dihydrate (TERRA ALBA #1) | 8.0 | 8.0 |
| Vinyl acetate-ethylene (RP223) | 4.0 | 4.0 |
| Sodium Citrate Dihydrate | 0.1 | 0.1 |
| Sodium Glutinate | 0.2 | 0.2 |
| Lithium Carbonate | 0.1 | 0.1 |
| Ethyl Hydroxyethyl Cellulose (300 ± 60 mPa · 5*) | 0.15 | 0.15 |
| Casein (80 mesh) | 0.35 | 0.35 |
| Dry Defoamer (TROYKD D-126) | 0.5 | 0.5 |
| Sulfite Liquors/cooking liquors (oxidized) | 0.1 | 0.1 |
| Polysaccharide starch, acid hydrolyzed, 2-hyroxypropyl ether (STARPOL 630) | 0.0 | 0.75 |
| Silica Sand (#70 mesh) | 36.0 | 35.25 |
| | 100.0 | 100.0 |

*Viscosity range (Brookfield 2% solution)

The various powders were mixed with water at a ratio of 250 g H$_2$O/1000 g dry powder. Plywood was used as a test substrate, and the resulting composition was poured onto a diked 4"×4" portion of the substrate to a thickness of one-fourth inch. Quarry tile was applied the next day using a ⅛" layer of standard latex mortar. In a first application method (#1), a primer consisting of 98.8 wt-% carboxylated acrylic polymer (approx. 47% solids) and 1.2 wt-% Coalescing agent (TEXANOL) was first applied to the plywood substrate and allowed to cure for one hour before pouring the underlayment (formula A). Method #2 involved applying the underlayment (formula A) to the plywood substrate without primer, and Method #3 involved applying the underlayment (formula B) to the plywood substrate without the primer. Shear test of the quarry tile to plywood through the above methods of underlayment application are illustrated below.

| | SHEAR BOND (IN PSI) QUARRY TILE TO PLYWOOD | | | |
|---|---|---|---|---|
| METHOD | 72 HOUR | 7 DAY | 14 DAY | 28 DAY |
| #1 | 181.9 | 241.5 | 318.6 | 241.8 |
| #2 | 159.1 | 324.6 | 283.7 | 175.8 |
| #3 | 162.5 | 257.4 | 301.7 | 236.7 |

The long term bonding strength of the tile is what is important. Method #3 maintains its bond to a higher degree than Method #2. The bonds of Method #3 closely match the strength of Method #1 without the additional material and application step involving its primer.

The foregoing description, examples and data are illustrative of the invention described herein, and they should not be used to unduly limit the scope of the invention or the claims. Since many embodiments and variations can be made while remaining with the spirit and scope of the invention, the invention resides wholly in the claims hereinafter appended.

What is claimed is:

1. A cement adhesive composition for a cellulosic or non-porous substrate comprising:
   (a) about 5 to 99 parts by weight of a cement powder;
   (b) about 0.25 to 75 parts by weight, based on the polymeric solids content, of a polymeric latex composition selected from the group consisting of liquid polymeric latexes and dried polymeric latex solids;
   (c) about 0.01 to 10 parts by weight of a water soluble polysaccharide compound selected from the group consisting of starch esters and ethers;
   (d) about 0 to 90 parts by weight of a filler; and
   (e) a sufficient amount of water to form a smooth, moist, evenly-consistent composition;
   wherein the components are combined to form composition having about 100 parts by weight exclusive of water.

2. The composition of claim 1 which comprises:
   (a) about 15 to 50 wt % of a cement powder;
   (b) about 0.5 to 50 wt %, based on the polymeric solids content, of a polymeric latex composition selected from the group consisting of liquid polymeric latexes and dried polymeric latex solids;
   (c) about 0.1 to 2 wt % of a water soluble polysaccharide compound selected from the group consisting of starch esters and ethers; and
   (d) about 1 to 70 wt % of a filler.

3. The composition of claim 2 wherein the polymeric latex composition is a vinyl acetate-ethylene copolymer.

4. The composition of claim 2 wherein the water soluble polysaccharide compound is an acid hydrolyzed, polysaccharide starch.

5. The composition of claim 2 which is a cement adhesive wherein the composition is stiff enough to maintain ridges applied with a notched trowel.

6. The composition of claim 2 which is a cement underlayment composition wherein the composition is flowable.

7. A cement composition for a cellulosic or non-porous substrate comprising:
   (a) dry ingredients including:
      (i) about 5 to 99 parts by weight of a cement powder; and
      (ii) about 0 to 90 parts by weight of a filler; and
   (b) an aqueous composition including:

(i) about 0.25 to 75 parts by weight, based on the polymeric solids content, of a polymeric latex composition selected from the group consisting of liquid polymeric latexes and dried polymeric latex solids;

(ii) about 0.01 to 10 parts by weight of a water soluble polysaccharide compound selected from the group consisting of starch esters and ethers; and (iii) a sufficient amount of water to form a smooth, moist, evenly-consistent composition;

wherein the dry and liquid ingredients are combined to form the composition having 100 parts by weight exclusive of the water.

8. The composition of claim 7 which comprises:

(a) about 15 to 50 wt % of a cement powder;

(b) about 0.5 to 50 wt %, based on the polymeric solids content, of a polymeric latex composition selected from the group consisting of liquid polymeric latexes and dried polymeric latex solids;

(c) about 0.1 to 2 wt % of a water soluble polysaccharide compound selected from the group consisting of starch esters and ethers; and (d) about 1 to 70 wt % of a filler.

9. The composition of claim 8 wherein the polymeric latex composition is a vinyl acetate-ethylene copolymer.

10. The composition of claim 8 wherein the water soluble polysaccharide compound is an acid hydrolyzed, polysaccharide starch.

11. The composition of claim 8 which is a cement adhesive wherein the composition is stiff enough to maintain ridges applied with a notched trowel.

12. The composition of claim 8 which is a cement underlayment composition wherein the composition is flowable.

* * * * *

UNITED STATES PATENT AND TRADEMARK OFFICE
CERTIFICATE OF CORRECTION

PATENT NO. : 5,366,550
DATED : November 22, 1994
INVENTOR(S) : Gregory W. Schad It is certified that error appears in the above-identified patent and that said Letters Patent is hereby corrected as shown below:

Column 7, line 26, "is" should read --are--

Column 7, line 47, delete ".50 under heading"(A)wt-%" and insert under heading "(B) wt-%"

Column 8, line 43, "9" should read --]--

Column 10, line 7, "Polyer" should read --Polymer--

Column 11, line 16, "an" should read --and--

Column 12, line 40, "40,00" should read --40,000--

Column 12, line 43, delete ".50" under heading"(A) wt-%" and insert under heading "(B) wt-%"

Column 12, line 44, delete ".50" under heading "(A) wt-%" and insert under heading "C() wt-%"

Signed and Sealed this

Fourth Day of April, 1995

Attest:

BRUCE LEHMAN

*Attesting Officer*   *Commissioner of Patents and Trademarks*